United States Patent [19]

Eguchi

[11] 4,432,024
[45] Feb. 14, 1984

[54] METHOD AND APPARATUS FOR MINIMIZING NON-LINEAR DISTORTION IN THE RECORDING OF A BI-LEVEL SIGNAL

[75] Inventor: Takeo Eguchi, Hadano, Japan

[73] Assignee: Sony Corporation, Tokyo, Japan

[21] Appl. No.: 263,062

[22] Filed: May 13, 1981

[30] Foreign Application Priority Data

May 24, 1980 [JP] Japan ................................. 55-69446

[51] Int. Cl.³ .............................................. G11B 5/09
[52] U.S. Cl. ....................................... 360/45; 360/40
[58] Field of Search ...................... 360/45, 46, 65, 68, 360/40

[56] References Cited

U.S. PATENT DOCUMENTS

| | | | |
|---|---|---|---|
| 3,067,422 | 12/1962 | Hunt | 360/45 |
| 3,159,840 | 12/1964 | Wou | 360/45 |
| 3,503,059 | 3/1970 | Ambrico | 360/45 |
| 3,775,759 | 11/1973 | Armitage, Jr. et al. | 360/45 |
| 3,869,714 | 3/1975 | Schneider et al. | 360/45 |

Primary Examiner—Vincent P. Canney
Attorney, Agent, or Firm—Lewis H. Eslinger; Alvin Sinderbrand

[57] ABSTRACT

A bi-level signal is recorded so as to minimize distortion when that signal is reproduced, comprising pre-distorting the duty ratio of the bi-level signal by increasing the duty ratio when the repetition rate of the bi-level signal increases abruptly, and then recording the distorted bi-level signal.

19 Claims, 8 Drawing Figures

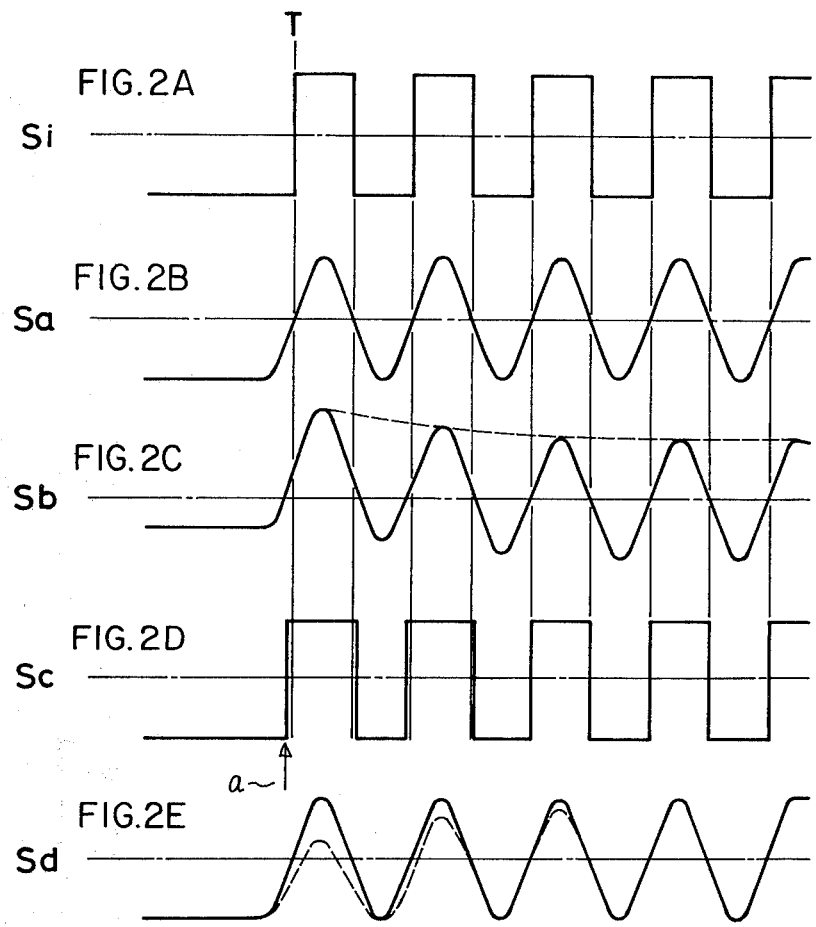

METHOD AND APPARATUS FOR MINIMIZING NON-LINEAR DISTORTION IN THE RECORDING OF A BI-LEVEL SIGNAL

BACKGROUND OF THE INVENTION

This invention relates to the recording of a bi-level signal exhibiting high bit density and, more particularly, to a method and apparatus of recording such a bi-level signal whereby non-linear distortion is minimized.

In recording bi-level signals on a magnetic medium, such as magnetic tape, the level of the bi-level signal reproduced therefrom is reduced in a non-linear manner if the bit density suddenly is increased. Also, the phase of such a reproduced bi-level signal is subjected to non-linear distortion. Such non-linear amplitude and phase distortion is referred to as "carrier-drop" or "over-modulation" when the bi-level signal is a pulse carrier whose repetition rate, or frequency, is modulated to represent information. Such non-linear distortion is referred to as "peak-shift" when the bi-level signal is a digital signal whose binary bits represent information, such as a PCM signal, a binary coded decimal signal, or the like.

The carrier-drop, or over-modulation effect is most pronounced when the frequency of the FM pulse carrier changes abruptly from a relatively lower frequency to a higher frequency. The peak-shift effect is most pronounced when the bit content of the digital signal changes over from, for example, a string of "0"s (or a string of "1"s) to an alternating bit pattern of "0"s and "1"s. That is, when the bit density of the recorded digital signal increases, the peak-shift phenomenon is most noticeable.

In most cases, i.e. an abrupt increase in the frequency of the FM pulse carrier, or an abrupt increase in the bit density of the digital signal, non-linear amplitude and phase distortions are at a maximum at the beginning of the change-over, and thereafter gradually dissipate. Hence, if the higher FM pulse carrier frequency, or the higher bit density of the digital signal continues, the non-linear distortion in the reproduced signal gradually is reduced. Consequently, after a number of cycles of the FM pulse carrier, or after a number of bit alternations in the digital signal, the reproduced signal is recovered without such non-linear distortion.

Non-linear distortion of the aforenoted type is enhanced when the FM or digital signals are recorded with relatively high recording currents. Also, if the wavelength of the recording signal is relatively short, or if the effective distance, or gap, between the recording head and the magnetic medium is relatively large, there is a greater propensity for the signal to be reproduced with non-linear distortion.

If the FM pulse carrier represents, for example, video information, non-linear distortion therein results in a distorted reproduced video signal which can be perceived as a distorted video picture. If the recorded signal is a digital signal, then, since binary "1"s and "0"s are detected as a function of the "zero-crossing" points of the reproduced signal, the non-linear distortion, which appears as peak-shifts in the reproduced digital signal, impedes satisfactory detection of the zero-crossing points and, thus, makes it difficult to adequately detect the reproduced digital signal.

It has been thought that non-linear distortion in the reproduced FM pulse carrier can be compensated by momentarily increasing the recording current at the instant that the frequency of the FM pulse carrier changes from lower to higher frequency levels. However, this type of compensation is dependent upon a detecting circuit which functions to accurately detect this low-to-high frequency change. Such a detecting circuit is not simple to implement and, thus, adds to the complexity and cost of the recording circuitry. Furthermore, even if this frequency change-over can be detected accurately, it is difficult to maintain optimum recording current levels. If the recording current exceeds the optimum level, as may easily occur, then the resultant large recording current is, itself, a source of non-linear distortion, as mentioned above. Furthermore, in order to control the recording current levels properly, the usual recording amplifier must be an analog amplifier, as opposed to a relatively simpler, less expensive switching-type amplifier.

There has, therefore, been a need for compensating FM pulse carriers and digital signals during the recording thereof such that the signals may be reproduced with minimal non-linear distortion .

OBJECTS OF THE INVENTION

Therefore, it is an object of the present invention to provide an improved method and apparatus for recording FM pulse carrier signals and digital signals, referred to herein as "bi-level" signals, whereby such bi-level signals are reproduced with minimal non-linear distortion.

Another object of this invention is to provide improved method and apparatus for recording bi-level signals such that, even if the repetition rate, or bit density, of such bi-level signals increases abruptly, the signals may be reproduced from the record medium with minimal non-linear distortion.

A further object of this invention is to pre-distort the aforementioned bi-level signals, prior to the recording thereof, so as to compensate, or cancel, the expected non-linear distortion which may be present if the bi-level signal repetition rate, or bit density, increases abruptly.

An additional object of this invention is to increase the duty ratio of the bi-level signal, prior to recording thereof, when the frequency, or bit density, of the bi-level signal increases abruptly.

Yet another object of this invention is to pre-distort the aforementioned bi-level signal, prior to recording thereof, as a function of the information (e.g. frequency or bit density) represented by that bi-level signal.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for recording a bi-level signal so as to minimize non-linear distortion thereof when that signal is reproduced. The bi-level signal, which may be an FM pulse carrier, whose frequency represents information, or which may be a digital signal containing binary "1"s and "0"s is pre-distorted when the repetition rate, or bit density, thereof increases abruptly. This pre-distortion comprises increasing the duty ratio of the bi-level signal over the normal duty ratio thereof for a plurality of cycles. Thereafter, the duty ratio of the bi-level signal gradually returns to its normal duty ratio, even though the repetition rate, or bit density, remains at the increased level. This pre-distorted bi-level signal is recorded.

In accordance with one aspect of the present invention, prior to pre-distortion, higher frequency components of the bi-level signal are removed. In accordance with another aspect, the aforementioned pre-distortion is implemented by a phase modifying circuit which, in a preferred embodiment, comprises an R-C differentiating circuit, and further includes an additional resistance connected in parallel with the capacitance of the R-C differentiating circuit.

As another aspect of this invention, the output of the phase modifying circuit is supplied to a comparator wherein the phase-modified bi-level signal is compared to a predetermined threshold level, such as a zero level, the comparator producing a positive-going pulse signal when the level of the phase-modified bi-level signal crosses the threshold level in the positive direction, and the comparator produces a negative-going pulse signal when the level of the phase-modified bi-level signal crosses the threshold level in the negative direction. Preferably, the output of the comparator is amplified by a switching amplifier, prior to being supplied to the recording head.

BRIEF DESCRIPTION OF THE DRAWINGS

The following detailed description, given by way of example, will best be understood in conjunction with the accompanying drawings in which:

FIGS. 2A-2E are waveform diagrams which are useful in understanding the operation of the present invention.

DETAILED DESCRIPTION OF A PREFERRED EMBODIMENT

Figure 1:
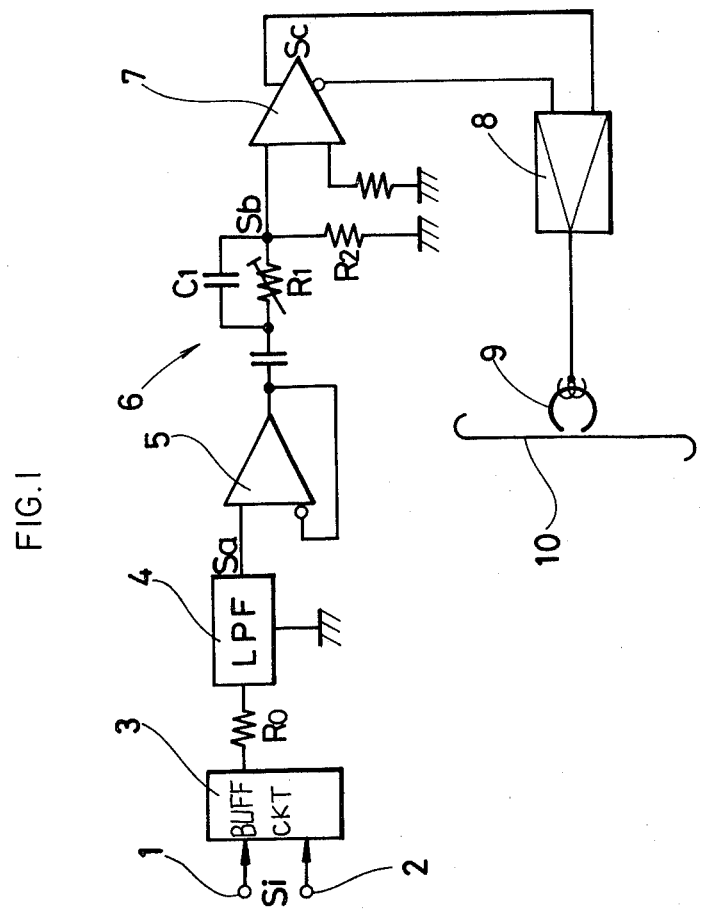
FIG. 1 is a partial block, partial schematic diagram of one embodiment of the present invention.

Referring now to the drawings, and in particular to FIG. 1, there is illustrated one embodiment of a recording circuit which includes the present invention. This recording circuit is comprised of a buffer circuit 3, a low pass filter 4, a phase-modifying circuit 6, a comparator 7, an amplifier 8, and a recording head 9. Buffer circuit 3, which may include an operational amplifier or other conventional circuit having a relatively high input impedance and low output impedance, is coupled to input terminals 1 and 2 and is adapted to receive a bi-level input signal $S_i$. This bi-level signal $S_i$ may be an FM pulse carrier whose frequency is modulated to represent information. Alternatively, bi-level signal $S_i$ may be a digital signal comprised of binary "1"s and "0"s. The output of buffer circuit 3 is coupled to low pass filter 4 via a current-limiting resistor $R_o$.

The low pass filter is adapted to remove higher frequency components from the bi-level signal. As will be appreciated from the description set out hereinbelow, low pass filter 4 thus functions to shape the sharp, perpendicular leading and trailing edges of the bi-level signal to gradually increasing and decreasing edges. If the input bi-level signal $S_i$ is formed of such gradually increasing and decreasing leading and trailing edges, that is, if the bi-level signal exhibits suitable gradients, low pass filter 4 may be omitted. The output of the low pass filter is coupled to phase-modifying circuit 6 via another buffer circuit 5. In the illustrated example, buffer circuit 5 is comprised of an operational amplifier having, for example, a non-inverting input coupled to the output of low pass filter 4 and an inverting input (represented by the circle illustrated in FIG. 1) connected in feedback relationship with with the output of the operational amplifier.

Phase-modifying circuit 6 functions in a manner analogous to that of an R-C differentiating circuit and is comprised of a capacitor $C_1$ connected in series with the output of buffer circuit 5, and a resistor $R_2$ connected in shunting relationship to ground potential. An additional, adjustable resistor $R_1$ is connected in parallel with capacitor $C_1$. As one example thereof, adjustable resistor $R_1$ may be a voltage-controlled resistor, such as the collector-emitter resistance of a bipolar transistor, or the source-drain resistance of a field effect transistor, or the like. It is appreciated that phase-modifying circuit 6 functions to modify the phase of the signal supplied thereto as a function of the frequency of that signal.

The output of the phase-modifying circuit, that is, the junction defined by capacitor $C_1$ and resistor $R_2$, is coupled to comparator 7. The comparator is adapted to compare the phase-modified bi-level signal supplied thereto from the phase-modifying circuit with a predetermined threshold level. In the preferred embodiment of the present invention, this predetermined threshold level is the zero level. Thus, comparator 7 functions to detect the zero-crossing point of the phase-modified bi-level signal supplied thereto. Alternatively, comparator 7 may function to compare the phase-modified bi-level signal to a mean value or to an AC reference potential. The comparator is seen to include two inputs, one coupled to the output of phase-modifying circuit 6, and the other coupled, via a resistance, to ground.

The output of comparator 7 is coupled, via amplifier 8, to recording head 9. In the preferred embodiment, amplifier 8 is a so-called switching amplifier of a type known to those of ordinary skill in the art. Recording head 9 functions as a recording transducer and is adapted to record the amplified phase-modified bi-level signal on magnetic medium 10. As one example thereof, magnetic medium 10 is magnetic tape.

The operation of the recording circuit illustrated in FIG. 1 now will be described with reference to the waveforms shown in FIGS. 2A-2E. The input bi-level signal $S_i$ is represented in FIG. 2A. If this bi-level signal is a digital signal, it may be assumed that, prior to time T, a string of binary "0"s was present and, thereafter, the digital signal alternates between binary "1" and "0". Thus, from time T, input bi-level signal $S_i$ exhibits the bit sequence of [10101010]. Alternatively, bi-level signal $S_i$ may be an FM pulse carrier signal which, prior to time T, exhibits a relatively lower frequency and, starting at time T, exhibit a relatively higher frequency. In both cases, that is, whether input bi-level signal $S_i$ is a digital signal or is an FM pulse carrier, the level changeover rate thereof increases abruptly at time T.

This input bi-level signal $S_i$ is supplied, by buffer circuit 3, to low pass filter 4. As mentioned above, the low pass filter removes the higher frequency components from bi-level signal $S_i$, resulting in the filtered bi-level signal $S_a$, shown in FIG. 2B. As also mentioned above, if bi-level signal $S_i$ exhibits gradually increasing and decreasing leading and trailing edges, rather than the perpendicular leading and trailing edges shown in FIG. 2A, that is, if the input bi-level signal exhibits the waveform shown in FIG. 2B, low pass filter 4 may be omitted.

The filtered bi-level signal $S_a$ is supplied, via buffer circuit 5, to phase-modifying circuit 6. The differentiating action of the phase-modifying circuit modifies the waveform of the filtered bi-level signal so as to produce the phase-modified bi-level signal $S_b$, shown in FIG. 2C. It is seen that, although the waveform of phase-modified bi-level signal $S_b$ resembles the waveform of filtered bi-level signal $S_a$, the mean level of the phase-modified signal $S_b$ appears to be shifted in the upward direction, relative to an average, or zero level, for the first cycle thereof commencing with time T, and then the mean level is seen to gradually return to its normal, zero level. The broken line shown in FIG. 2C represents this return of the mean level of the phase-modified signal $S_b$ from its initial, higher amplitude to its normal amplitude.

As a result of this level-shift in the phase-modified bi-level signal $S_b$, the zero-crossing points thereof are dislocated. That is, the initial, or positive-going zero-crossing point of the phase-modified signal $S_b$ occurs in advance of the normal positive-going zero-crossing point, shown in FIG. 2B. The negative-going zero-crossing point of this cycle of the phase-modified signal $S_b$ occurs at a time delayed from the normal negative-going zero-crossing point. At the next cycle, the positive-going zero-crossing point of phase-modified signal $S_b$ occurs at a time that is closer to, but still in advance of, the normal positive-going zero-crossing point; and the negative-going zero-crossing point of this cycle is seen to be delayed from the normal negative-going zero-crossing point. At the next and succeeding cycles of the phase-modified bi-level signal $S_b$, the zero-crossing points appear to coincide with the normal zero-crossing points shown in FIG. 2B. This distortion in the zero-crossing points of the phase-modified signal $S_b$ is referred to as a phase distortion. Thus, phase-modifying circuit 6 is seen to phase-distort the filtered bi-level signal $S_a$. This phase distortion is a maximum at the initial cycle, commencing at time T, and thereafter gradually dissipates. In the illustrated example, this phase distortion no longer is present at about the third cycle of the filtered bi-level signal.

The phase-modified bi-level signal $S_b$, produced at the output of phase-modifying circuit 6, is supplied to comparator 7 whereat it is compared with the aforesaid threshold, mean or AC reference potential. As will be appreciated, comparator 7 functions as an amplitude limiter to shape the phase-modified signal such that the gradually increasing and decreasing leading and trailing edges thereof, respectively, appear as abruptly-changing, vertical edges, as shown in FIG. 2D. Comparator 7 thus shapes phase-modified signal $S_b$ to appear as a more sharply defined pulse signal $S_c$.

From FIG. 2C, it is seen that phase-modified bi-level signal $S_b$ exhibits a higher duty ratio when the repetition rate of the input bi-level signal $S_i$ increases abruptly. That is, during the first few cycles of the higher frequency bi-level signal, the positive-going zero-crossing points of phase-modified signal $S_b$ occur in advance of the un-modified signal $S_a$; and the negative-going zero-crossing points lag the un-modified negative-going zero-crossing points. Consequently, the duty ratio of the shaped pulse signal $S_c$, produced at the output of comparator 7, is correspondingly increased, as shown in FIG. 2D. That is, at the point where the frequency, or repetition rate of the bi-level signal increases, shown as point "a" in FIG. 2D, the duty ratio of the shaped, phase-modified bi-level signal $S_c$ is increased over the normal duty ratio and then, over the next few cycles, this increased duty ratio gradually diminishes to the normal duty ratio. As shown in FIG. 2D, the duty ratio of the shaped bi-level signal $S_c$ is substantially equal to the normal duty ratio by the third cycle thereof. That is, the width of the positive-going pulses of shaped, phase-modified bi-level signal $S_c$ is increased above the normal pulse width, commencing at point "a", and then, over the next few cycles thereof, gradually reduces to the normal pulse width. Since the repetition rate of this shaped, phase-modified bi-level signal $S_c$ remains the same as the repetition rate of the input bi-level signal $S_i$, it is seen that the pulse width of the negative-going pulses is reduced during those cycles that the pulse width of the positive-going pulse is increased.

The shaped, phase-modified bi-level signal $S_c$ is amplified by switching amplifier 8 and then recorded by a suitable magnetic recording transducer, such as recording head 9. As mentioned hereinabove, it would be expected that, since the repetition rate of the bi-level signal $S_c$ increases abruptly at point "a", during reproduction thereof the reproduced bi-level signal will be subjected to non-linear distortion. If the input bi-level signal $S_i$ had not been pre-distorted by phase-modifying circuit 6, that is, if the input bi-level signal shown in either FIG. 2A or FIG. 2B had been recorded, then the waveform of that signal when reproduced would appear as shown by the broken lines in FIG. 2E. FIG. 2E illustrates the non-linear distortion wherein the reproduced bi-level signal, commencing at point "a", that is, at the point where the repetition rate thereof increases abruptly, undergoes a reduction in signal level. Such non-linear distortion gradually diminishes, whereby the reproduced bi-level signal level corresponds to the recorded signal level, as shown by the broken lines of FIG. 2E.

However, in accordance with the present invention, the recorded bi-level signal $S_c$ (FIG. 2D) is pre-distorted such that the duty cycle thereof is increased at the point where the repetition rate increases abruptly, and thereafter this duty cycle gradually returns to the normal duty cycle. Consequently, the non-linear distortion to which pre-distorted bi-level signal $S_c$ is subjected during reproduction is cancelled by this pre-distortion. The solid lines shown in FIG. 2E illustrate that the reproduced bi-level signal $S_d$ exhibits its normal amplitude even during those few cycles following the abrupt increase in the repetition rate of the recorded bi-level signal. One explanation for this improvement is that the non-linear distortion results in an effective reduction in the duty cycle of the reproduced signal, shown by the broken lines in FIG. 2E; but this reduction in the duty cycle is cancelled, or compensated, by the pre-distorted increase in the duty cycle of the recorded bi-level signal $S_c$.

Figure 3A:
FIGS. 3A and 3B are waveform diagrams which are useful in understanding the advantages attained by the present invention.
Figure 3B:
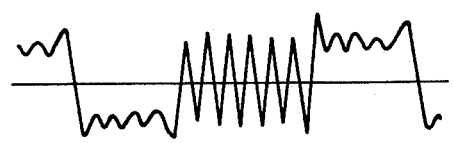

FIG. 3A represents the waveform of a reproduced bi-level signal whose repetition rate increases abruptly at point T, and which is not subjected to pre-distortion. As an example, the wavelength of the higher repetition rate may be on the order of about 0.9 microns; and the magnetic medium may be, for example, a Co-γ magnetic tape. The broken line in FIG. 3A represents the reduced signal level of the reproduced bi-level signal, commencing at point T; this signal level gradually increasing to its normal level. FIG. 3B is a waveform of the same reproduced bi-level signal which had been subjected to the aforementioned phase-modifying pre-distortion. It is seen that, because of his pre-distortion, the reproduced bi-level signal of FIG. 3B is not subjected to an undesired decrease in signal level even when the repetition rate of the bi-level signal increases abruptly. A comparison of FIGS. 3A and 3B indicates that the zero-crossing points for the waveform shown in FIG. 3B are more readily detected than the zero-crossing points for the waveform of FIG. 3A. Hence, if the bi-level signal is a digital signal, the binary "1"s and "0"s which represent the useful information are readily detected by simple, conventional zero-crossing detection techniques. Hence, the useful information is readily recovered. In FIG. 3A, however, at least the initial zero-crossing points of the bi-level signal having higher repetition rate are not easily detected. Consequently, the useful information represented by this portion of the reproduced signal may not be easily recovered.

In the embodiment shown in FIG. 1, low pass filter 4 is provided in order to remove the higher frequency components of the input bi-level signal $S_i$. If the circuitry which produces bi-level signal $S_i$ is formed of high speed logic circuits, such as emitter-coupled logic circuits, the response time of such circuitry is sufficiently high that the rise-times and fall-times of the leading and trailing edges of bi-level signal $S_i$ are extremely short. That is, the leading and trailing edges are sharply defined, and rise and fall quickly. A suitable phase-modifying circuit which would effectively increase the duty ratio of such a sharply defined bi-level signal whose repetition rate increases abruptly is complex. Accordingly, to simplify the design of phase-modifying circuit 6, low pass filter 4 is utilized in order to remove the higher frequency components of the input bi-level signal $S_i$, thereby increasing the rise-times and fall-times of the leading and trailing edges. That is, low pass filter 4 is employed to impart the illustrated gradient to the input bi-level signal, resulting in the waveform $S_a$, shown in FIG. 2B. Of course, the low pass filter may be omitted if the input bi-level exhibits the waveform shown in FIG. 2B.

From FIG. 3A, it is appreciated that the non-linear distortion imparted to the reproduced bi-level signal is dependent upon the wavelength of that signal. In particular, if the wavelength of the reproduced bi-level signal is relatively small, as when the repetition rate thereof increases abruptly, the non-linear distortion results in a correspondingly low reproduced signal level. It is appreciated that the pre-distortion of the bi-level signal, prior to recording, serves to cancel, or compensate, this undesired non-linear distortion in the reproduced bi-level signal.

By use of the present invention, only the phase of the bi-level signal is modified. Accordingly, the recording amplifier, such as amplifier 8, need not be restricted to an analog amplifier but, rather, may be constructed as a switching amplifier which, as is known, is a far simpler amplifying circuit.

Furthermore, it is seen that the pre-distortion of the bi-level signal prior to recording thereof, that is, the change in the duty ratio of the bi-level signal, is a function of the information content of that bi-level signal. For example, if the bi-level is an FM pulse carrier whose frequency represents information, then the duty ratio of the bi-level signal is increased if the frequency of that carrier increases abruptly. Likewise, if the bi-level signal is a digital signal whose binary "1"s and "0"s represent information, then the duty cycle of the digital pulse signals increases if the bit density of the digital signal increases abruptly.

By reason of the present invention, non-linear distortion is substantially cancelled, or compensated, by pre-distorting the bi-level signal. Consequently, the optimum signal recording current level may be chosen independently of the phase-modifying characteristics of phase-modifying circuit 6. Hence, adjustments which may be desirable to the recording current levels or to the phase-modifying characteristics, need not be interdependent on each other. Hence, the recording of the bi-level signals may be carried out at optimum levels with minimal non-linear distortion during reproduction.

While the present invention has been particularly shown and described with reference to a preferred embodiment thereof, it will be readily apparent to those of ordinary skill in the art that various changes and modifications in form and details may be made without departing from the spirit and scope of the invention. For example, a phase-modifying circuit equivalent to the R-C circuit shown in FIG. 1 may be used to carry out a comparable change in the duty ratio of the bi-level signal when the repetition rate thereof increases. Likewise, other suitable circuitry may be used as comparator 7 which serves to shape the phase-modified bi-level signal $S_b$ so as to appear as the pulse signal $S_c$ having sharply defined, rapidly rising and falling leading and trailing edges. Also, it should be appreciated that buffer circuits 3 and 5 may be constructed as conventional devices serving to isolate those circuits which are connected to the input thereof from the circuits which are connected to the output thereof. Still further, and as mentioned hereinabove, low pass filter 4 is utilized to remove higher frequency components from the input bi-level signal $S_i$; and this low pass filter may be omitted if the input bi-level signal exhibits gradually increasing and decreasing leading and trailing edges, respectively, such as shown in FIG. 2B.

Therefore, it is intended that the appended claims be interpreted as including the foregoing as well as various other such changes and modifications.

What is claimed is:

1. A method of recording a bi-level signal on a magnetic record medium so as to minimize distortion thereof when that signal is reproduced, comprising the steps of low-pass filtering said bi-level signal to remove higher frequency components thereof, differentiating the filtered bi-level signal to modify the phase thereof to increase the duty ratio of a plurality of consecutive cycles of said bi-level signal when the repetition rate at which bi-level signal changes over increases abruptly while maintaining the repetition rate thereof substantially unchanged; amplifying the phase-modified bi-level signal; and recording the amplified, phase-modified bi-level signal.

2. Apparatus for recording a bi-level signal on a record medium so as to minimize distortion thereof when said bi-level is reproduced, comprising differentiating means for distorting the duty ratio of said bi-level signal by increasing said duty ratio of a plurality of consecutive cylces of said bi-level signal when the repetition rate at which said bi-level signal changes over between levels increases abruptly while maintaining the repetition rate of said bi-level signal substantially unchanged; and means for recording the distorted bi-level signal.

3. A method of recording a bi-level signal on a magnetic record medium so as to minimize distortion thereof when that signal is reproduced, comprising the steps of low-pass filtering said bi-level signal to remove higher frequency compenents thereof; pre-distorting the filtered bi-level signal by modifying the phase thereof to increase the duty ratio of said bi-level signal by increasing said duty ratio over a normal duty ratio for a plurality of cycles of said bi-level signal when the level change-over rate thereof increases abruptly, and then return said duty ratio to said normal duty ratio thereafter; amplifying the phase-modified bi-level signal; and recording the amplified, phase-modified bi-level signal.

4. The method of claim 3 wherein said step of returning said duty ratio to said normal duty ratio comprises gradually reducing the increased duty ratio over a plurality of cycles to obtain said normal duty ratio.

5. The method of claim 3 wherein said bi-level signal is a digital signal representing binary information.

6. The method of claim 3 wherein said bi-level signal is a carrier signal whose frequency is modulated to represent information.

7. A method of recording a bi-level signal so as to minimize non-linear distortion thereof when that signal is reproduced, comprising the steps of differentiating the bi-level signal, when the repetition rate at which said bi-level signal changes over increases abruptly, to increase the duty ratio of a plurality of consecutive cycles of said bi-level signal having an increased repetition rate while maintaining the repetition rate of said bi-level signal substantially unchanged; and recording the differentiated bi-level signal.

8. The method of claim 7 wherein said duty ratio is increased by an amount which substantially cancels the expected non-linear distortion to which the reproduced bi-level signal is subjected when the repetition rate thereof is increased abruptly.

9. A method of recording a bi-level signal so as to minimize non-linear distortion thereof when that signal is reproduced, comprising the steps of predistorting the bi-level signal, when the repetition rate at which said bi-level signal changes over increases abruptly, by increasing the duty ratio of a plurality of cycles of said bi-level signal having an increased repetition rate by an amount which substantially cancels the expected non-linear distortion to which the reproduced bi-level signal is subjected when the repetition rate thereof is increased abruptly; and recording the pre-distorted bi-level signal while gradually returning the duty ratio of the bi-level signal having an increased repetition rate back to its normal duty ratio.

10. Apparatus for recording a bi-level signal on a record medium so as to minimize distortion thereof when said bi-level signal is reproduced, comprising pre-distorting means for distorting the duty ratio of said bi-level signal by increasing said duty ratio over a normal duty ratio of a plurality of cycles of said bi-level signal when the repetition rate at which said bi-level signal changes over between levels increases abruptly, and thereafter returning said duty ratio gradually to said normal duty ratio; and means for recording the distorted bi-level signal.

11. The apparatus of claim 10 wherein said predistorting means comprises phase modifying means for modifying the phase of said bi-level signal when the repetition rate thereof increases abruptly.

12. The apparatus of claim 11 wherein said phase modifying means comprises an R-C differentiating circuit, and additional resistance means connected in parallel with the capacitance means of said R-C differentiating circuit.

13. The apparatus of claim 12 wherein said additional resistance means comprises an adjustable resistance.

14. The apparatus of claim 11 wherein said pre-distorting means comprises low-pass filter means for filtering said bi-level signal to remove higher frequency components thereof and for supplying the filtered bi-level signal to said phase modifying means.

15. The apparatus of claim 10 wherein said means for recording comprises a switching amplifier.

16. The apparatus of claim 15 wherein said record medium comprises a magnetic medium; and said means for recording comprises a magnetic recording head coupled to said switching amplifier to receive the distorted bi-level signal therefrom.

17. Apparatus for recording a bi-level signal on a record medium so as to minimize distortion thereof when said bi-level signal is reproduced, comprising pre-distorting means for distorting the duty ratio of said bi-level signal by increasing said duty ratio when the repetition rate at which said bi-level signal changes over between levels increases abruptly; and means for recording the pre-distorted bi-level signal; wherein said pre-distorting means comprises:
phase modifying means for modifying the phase of said bi-level signal when the repetition rate thereof increases abruptly;
low-pass filter means for filtering said bi-level signal to remove higher frequency components thereof and for supplying the filtered bi-level signal to said phase-modifying means; and
comparator means coupled to said phase-modifying means to compare the phase-modified bi-level signal to a predetermined threshold level for producing a positive-going pulse signal when the level of said phase-modified bi-level signal crosses said threshold level in the positive direction and for producing a negative-going pulse signal when said level of said phase-modified bi-level signal crosses said threshold level in the negative direction.

18. The apparatus of claim 17 wherein said threshold level is a zero level.

19. The apparatus of claim 18 wherein said phase modifying means is operative to change the zero-level crossing points of said filtered bi-level signal when the repetition rate thereof increases abruptly.

* * * * *